(12) United States Patent
Wang et al.

(10) Patent No.: US 6,730,436 B2
(45) Date of Patent: May 4, 2004

(54) ALKALINE CELL WITH IMPROVED CATHODE

(75) Inventors: Francis P. Wang, Newtown, CT (US); J. Simon Xue, Bethel, CT (US); David Anglin, Brookfield, CT (US); James Rozelle, Fairfield, CT (US); Joseph Drennan, Derby, CT (US); Enoch I. Wang, Chantilly, VA (US)

(73) Assignee: The Gillette Company, Boston, MA (US)

( * ) Notice: Subject to any disclaimer, the term of this patent is extended or adjusted under 35 U.S.C. 154(b) by 407 days.

(21) Appl. No.: 09/941,526

(22) Filed: Aug. 29, 2001

(65) Prior Publication Data

US 2003/0049530 A1 Mar. 13, 2003

(51) Int. Cl.[7] .......................... H01M 4/48; H01M 4/58; H01M 4/62
(52) U.S. Cl. ........................ 429/220; 429/232
(58) Field of Search ................. 429/220, 232

(56) References Cited

U.S. PATENT DOCUMENTS

| | | |
|---|---|---|
| 1,255,283 A | 2/1918 | Benner et al. |
| 1,282,057 A | 10/1918 | Erwin |
| 4,060,676 A | 11/1977 | Dey et al. |
| 5,482,798 A | 1/1996 | Mototani et al. |
| 5,594,060 A | 1/1997 | Alig et al. |
| 5,846,509 A | 12/1998 | Alig et al. |
| 6,156,256 A | 12/2000 | Kennel |
| 6,248,478 B1 | 6/2001 | Friend et al. |

FOREIGN PATENT DOCUMENTS

| | | | |
|---|---|---|---|
| JP | 2513418 | | 7/1996 |
| JP | 2000-488816 | * | 2/2000 |

OTHER PUBLICATIONS

International Committee for Characterization and Terminology of Carbon, Journal Carbon, vol. 20, No (1982), pp. 445–449.

* cited by examiner

*Primary Examiner*—Bruce F. Bell
*Assistant Examiner*—Jonathan Crepeau
(74) *Attorney, Agent, or Firm*—Barry D. Josephs; Paul I. Douglas; Thomas G. Krivulka

(57) ABSTRACT

An alkaline cell having an anode comprising zinc, an alkaline electrolyte solution, a separator, and a cathode comprising copper iodate. The cathode preferably also includes a graphitic carbon to improve electrical conductivity. The graphtic carbon can comprise natural or synthetic graphites including expanded graphites and graphitic carbon fibers. Preferably, the graphitic carbon comprises graphitic carbon nanofibers. The carbon nanofibers desirably have a mean average diameter less than 500 nanometers. The cathode can also include sulfur in admixture with the copper iodate to improve cell performance.

22 Claims, 2 Drawing Sheets

US 6,730,436 B2

ALKALINE CELL WITH IMPROVED CATHODE

FIELD OF THE INVENTION

This invention relates to an aqueous alkaline cell with a cathode mixture comprising copper iodate, particularly copper iodate and additive of sulfur or graphitic carbon nanofiber.

BACKGROUND OF THE INVENTION

Conventional alkaline electrochemical cells have an anode comprising zinc and a cathode comprising manganese dioxide. The cell is typically formed of a cylindrical casing. The casing is initially formed with an enlarged open end and opposing closed end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing at the closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, polymeric binders, and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable since it has a high density and high purity. The resistivity of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3 \times 10^{-3}$ ohm-cm and $4 \times 10^{-3}$ ohm-cm.

It is desirable for a primary alkaline battery to have a high discharge capacity (i.e., long service life). Since commercial cell sizes have been fixed, it is known that the useful service life of a cell can be enhanced by packing greater amounts of the electrode active materials into the cell. However, such approach has practical limitations such as, for example, if the electrode active material is packed too densely in the cell, the rates of electrochemical reactions during cell discharge can be reduced, in turn reducing service life. Other deleterious effects such as cell polarization can occur as well. Polarization limits the mobility of ions within both the electrolyte and the electrodes, which in turn degrades cell performance and service life. Although the amount of active material included in the cathode typically can be increased by decreasing the amount of non-electrochemically active materials such as polymeric binder or conductive additive, a sufficient quantity of conductive additive must be maintained to ensure an adequate level of bulk conductivity in the cathode. Thus, the total active cathode material is effectively limited by the amount of conductive additive required to provide an adequate level of conductivity.

Although such alkaline cells are in widespread commercial use there is a need to improve the cell or develop a new type of cell that is cost effective and exhibits reliable performance and even longer service life for normal applications such as flashlight, radio, audio recorders and portable CD players.

SUMMARY OF THE INVENTION

The invention is directed to a primary (nonrechargeable) electrochemical alkaline cell having an anode comprising zinc and a cathode mixture comprising copper iodate $Cu(IO_3)_2$. The anode and cathode include an aqueous alkaline solution, preferably aqueous KOH solution. The copper iodate is preferably in the form of a powder having an average particle size between about 1 and 100 micron. The cathode mixture preferably also includes a sulfur additive. The additive is preferably sulfur but can also be elements selenium (Se) or tellurium (Te) and mixtures thereof. The sulfur additive enhances the cell performance, that is, elevates the running voltage of the cell, which in turn leads to increased power and cell life. The cathode mixture includes a conductive material such as flaky crystalline natural graphite or flaky crystalline synthetic graphite including expanded graphite and graphitic carbon nanofibers. The term graphitic carbon nanofibers as used herein shall mean graphitic carbon fibers having a mean average diameter less than 1000 nanometers (less than $1000 \times 10^{-9}$ meter). Preferably, the graphitic carbon nanofibers have a mean average diameter less than 500 nanometer, more preferably less than 300 nanometers. Desirably the graphitic carbon nanofibers have a mean average diameter between about 50 and 300 nanometers, typically between about 50 and 250 nanometers. The cathode mixture includes an aqueous KOH solution, desirably having a concentration of between about 30 and 40 percent by weight, preferably between 35 and 45 percent weight KOH in water.

The copper iodate preferably comprises between about 82 and 90 percent by weight of the cathode mixture. The graphitic conductive material, preferably comprising graphitic carbon nanofibers, desirably comprises between about 4 and 10 percent by weight of the cathode mixture. The sulfur additive desirably comprises between about 5 and 10 percent by weight of the cathode mixture. The aqueous KOH solution desirably comprises between about 5 and 10 percent by weight of the cathode mixture.

The alkaline cell of the invention having an anode comprising zinc and a cathode mixture comprising copper iodate exhibits high capacity (mAmp-hrs) under a moderate high current density (e.g. 21 milliAmp/$cm^2$ based on anode/ cathode interface) when compared to conventional alkaline cells having an anode comprising zinc and cathode comprising manganese dioxide.

DETAILED DESCRIPTION

Figure 1:
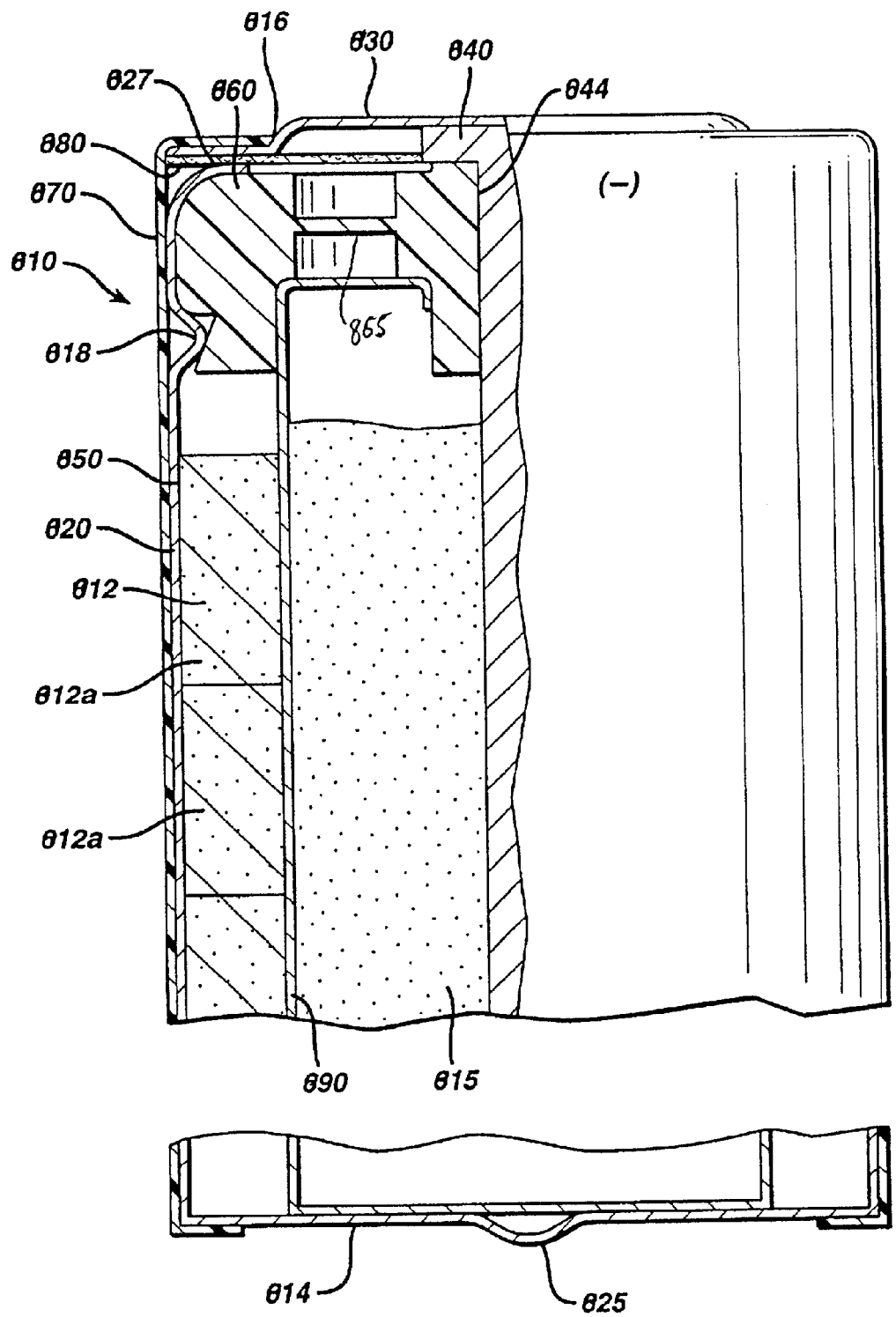
FIG. 1 is a cross-sectional cut away view of an alkaline cell having the cathode of the invention.

A representative alkaline cell utilizing the cathode mixture of the invention is shown in FIG. 1. The alkaline cell 810 comprises a cylindrical casing 820 of steel, preferably nickel plated steel, having a closed end 814 and an open end 816. The cell is preferably filled with cathode mixture 812 of the invention comprising copper iodate $Cu(IO_3)_2$ which functions as cathode active material and preferably also a sulfur additive. The cathode mixture 812 contains a conductive material such as flaky crystalline natural graphite or flaky crystalline synthetic graphite including expanded graphites and graphitic carbon nanofiber and mixtures thereof.

The term "graphite" or "graphitic material" as used herein shall include natural and synthetic crystalline graphites, expanded graphites, graphitic carbons, and graphitic carbon fibers. A graphitic carbon has the characteristics of an ordered three-dimensional graphite crystalline structure consisting of layers of hexagonally arranged carbon atoms stacked parallel to each other as determined by X-ray diffraction. As defined in International Committee for Characterization and Terminology of Carbon (ICCTC, 1982), published in the *Journal Carbon*, Vol. 20, p. 445 a graphitic carbon embraces the varieties of substances consisting of elemental carbon in allotropic form of graphite irrespective of of structural defects. The term graphitic carbon as used herein shall be construed in this manner.

The term carbon fibers shall mean elongated strands of carbon having length to diameter ratio greater than 4, typically greater than 8. The length to diameter ratio of carbon fibers can be much higher, for example, greater than 100 or more. The term "natural crystalline graphite" as used herein shall mean graphite that is minimally processed, i.e., essentially in its geologically occurring natural crystalline form. The term "synthetic graphite" as used herein shall mean synthetically prepared or processed graphite. The term "synthetic graphite" as used herein unless further qualified is also intended to include expanded forms of graphite (including expanded graphite that has been exfoliated) and graphitic carbon nanofibers. The term "expanded graphite" is a recognized term of art, for example, the form of graphite generally as referenced in U.S. Pat. No. 5,482,798. Further, expanded graphite as used herein can be formed from natural and/or synthetic non-expanded graphite processed so as to have a uniaxially expanded crystal lattice. The extent of uniaxial expansion can be sufficiently large such that the expanded graphite particles can completely exfoliate (i.e., separate into thin laminae). The term "flaky" as commonly used in connection with graphites, (i.e., natural or synthetic flaky graphites) is intended to reflect that such graphites have a plate-like, non-expanded particle form.

It has been determined that use of graphitic carbon nanofibers in the cathode mixture of the invention employing copper iodate, is particularly useful. The addition of the graphitic carbon nanofibers has a very significant effect in raising the running voltage of the cell and significantly increases the useful life of the cell. The graphitic carbon nanofibers can desirably be added in amount between about 3 and 10 percent by weight, preferably 4 to 10 percent by weight of the cathode mixture. Such carbon nanofibers can serve as the only graphite conductive material for the cathode or it can be admixed in the above amount or smaller amount with other graphite materials such as natural graphites and. Such graphitic carbon nanofibers, per se, are referenced in the published art and specific methods of manufacture are disclosed, for example, in U.S. Pat. Nos. 5,594,060; 5,846,509 and 6,156,256.

The term graphitic carbon fibers as used herein shall mean carbon fibers having a graphitic carbon structure as defined by the International Committee for Characterization and Terminology of Carbon (ICCTC, 1982), published in the *Journal Carbon*, Vol. 20, p. 445. The graphitic carbon nanofibers as used herein shall mean graphitic carbon fibers having a mean average diameter less than 1000 nanometers (less than $1000 \times 10^{-9}$ meters). Preferably, the graphitic carbon nanofibers have a mean average diameter less than 500 nanometer, more preferably less than 300 nanometers. Desirably the graphitic carbon nanofibers have a mean average diameter between about 50 and 300 nanometers, typically between about 50 and 250 nanometers. The graphitic carbon nanofiber useful in the cathode mixture 812 of the invention has a mean average diameter desirably less than about 300 nanometers, preferably between about 50 and 250 nanometers, typically about 200 nanometers. The mean average length of the carbon nanofibers is desirably between about 0.5 and 300 micron, typically about 200 micron. The graphitic carbon nanofibers can have a BET surface area between about 15 and 50 $m^2/g$, typically between 15 and 30 $m^2/g$.

A preferred graphitic carbon nanofiber for use in the cathode mixture 812 of the invention is a vapor grown graphitic carbon fiber available under the trade designation PR19HT carbon fibers from Applied Sciences, Cedarville, Ohio. Such graphitic carbon nanofibers can be made by hydrocarbon vapor pyrolysis methods described, for example, in Applied Sciences U.S. Pat. Nos. 6,156,256; 5,846,509; and 5,594,060 herein incorporated by reference. The resulting carbon nanofibers have a graphitic carbon structure as defined in International Committee for Characterization and Terminology of Carbon (ICCTC, 1982), published in the *Journal Carbon*, Vol. 20, p. 445. The vapor grown carbon fibers described in the above patent references are graphitic carbon fibers which can be made by the pyrolysis of hydrocarbon, for example, methane in a gas phase reaction at temperatures of around 1000° C. or higher. The gas phase reaction involving the hydrocarbon is carried out upon contact with metal particles, typically iron particles in a nonoxidizing gas stream. The iron particles catalyze the growth of very thin individual carbon fibers (e.g. carbon nanofibers) which have a graphitic carbon structure. The resulting carbon fibers can have a very thin diameter (nanofibers), for example, between 50 and 300 nanometers such as that available under the trade designation PR19HT graphitic carbon nanofibers (Applied Sciences).

A specific method of forming such graphitic carbon nanofibers is described, for example, in U.S. Pat. No. 6,156,256 as follows: The process includes the steps of providing in a reactor a first catalyst preferably in the form of solid particles having a size from 10 nanometers to 1000 nanometers, which is used to initiate the formation of the nanofibers. The first catalyst in the form of solid particles can be an iron catalyst, desirably iron sulfide. Other materials which can be used as solid particles for the first catalyst are listed in U.S. Pat. No. 6,156,256 as iron, nickel, cobalt, ferrocene, alloys of iron, alloys of nickel, alloys of cobalt, sulfur, iron sulfide, and nickel nitrate. A vacuum is applied to the reactor to create reduced pressure in the reactor. A carbon-based gas is introduced into the reactor. The carbon-based gas is a gas which forms carbon and hydrogen free-radical species upon pyrolysis. The carbon based gas as stated in U.S. Pat. No. 6,156,256 is desirably methane. However, as stated in this reference it can also be carbon dioxide, methane, ethane, propane, ethene, natural gas, and coal derivative gases and mixtures thereof. The reaction gas mixture desirably also comprises hydrogen. The hydrogen is provided to inhibit pyrolytic fattening of the nanofibers and to inhibit the formation of soot during the pyrolysis reaction. As indicated in U.S. Pat. No. 6,156,256 the reaction gas mixture used to form the nanofibers desirably comprises from 40 to 90 percent of hydrogen gas and from 10 to 60% of the carbon based gas, desirably a 50—50 mixture of the carbon based gas and hydrogen. As described in U.S. Pat. No. 6,156,256 a second growth catalyst may be used in admixture with the carbon-based gas and hydrogen gas. The second catalyst promotes diametric growth (growth of diameter) of the nanofibers. As stated in this reference the second catalyst is desirably ammonia. However, it may include hydrogen and ammonia and mixtures thereof.

To form the nanofibers the above gases are introduced into the reactor. Formation of the fibers can be carried out at reduced pressure of from about 10 to 100 Torr, desirably from about 20 to 50 Torr. The mixture of gases can be formed into a plasma by means of a plasma generating source preferably a microwave generator, but may also be a hot filament, radio frequency (RF) generator, or by an electrical discharge generator. When the first catalyst is formed of the above described solid particles they are desirably supported on a substrate such as an inert dielectric material such as quartz, ceramic and refractory materials, preferably ceramic material which can be placed within the reactor, desirably within the reactor feed inlet. The reactor itself is constructed of materials which are resistient to heat and corrosion, for example nickel, high temperatre steel, quartz, ceramic, and refractory material. Power is turned on and the reactor heated. The mixture of gases is then formed into a plasma within the reactor at above described reduced pressure and at a catalyst substrate temperature of about 800° C. to 1200° C., desirably a temperature between about 800° C. and 1000° C. The gas rate can typically be between 20 and 1000 scfm (standard cubic feet per minute), desirably about 100 scfm. If a microwave power source is used, the latter reference describes generating between about 600 and 1200 Watts of power to convert the carbon-based gas to gas plasma catalyzed by the above mentioned solid catalyst. The plasma gas contains carbon free-radicals, hydrogen free radicals, and oxygen free-radicals. The carbon is captured by the catalyst to form the graphitic carbon nanofibers. The power supply is discontinued once the desired amount of nanofibers are formed. In another approach as described in U.S. Pat. No. 6,156,256 the first catalyst can be in a gaseous state instead of being provided in the form of solid particles. Suitable gaseous catalysts are described as being selected from iron pentacarbonyl, hydrogen sulfide, and a ferrocene-xylene mixture. If such gaseous catalyst is employed, it may be supplied in combination with the carbon-based gas and hydrogen mixture. In this embodiment the graphitic carbon nanofibers can be produced in steady state and collected as they are formed.

The graphitic carbon nanofibers contain impurities which are residual amount of the catalyst, typically iron or iron compound (or other metal or material above described), which were used to catalyze the gas phase reaction. It has been determined by Applicants herein that if such impurities are removed, a highly desirable conductive carbon nanofiber is obtained. Such purified graphitic carbon nanofiber can be added advantageously in nominal amount (e.g. 3 to 10 percent by weight) to cathode active material such as copper iodate. The addition of the purified graphitic carbon nanofibers to copper iodate cathode mixtures for alkaline cells improves the cathode electrical conductivity very significantly. It is not known with certainty why this occurs. The very thin graphitic carbon nanofibers fibers appear to increase the number of electrical contact points and conductive pathways between the individual copper iodate particles more than the same percent by weight of conventional graphites. The tendency of the graphitic carbon nanofiber to attach to the carbon iodate particles may be another favorable factor. This in turn raises the cell's running voltage and extends the cell's service life.

It has been determined that the iron (or other metal) impurity which are residual catalyst impurities imbedded in the graphitic carbon nanofiber can be readily removed therefrom by subjecting the nanofibers to heating at temperatures between about 2500° C. and 3100° C. after the fibers have been formed. Such heating vaporizes the metal impurities and can also serve to further graphitize the carbon fiber, particularly the surface of the fibers. The end result is a purified graphitic carbon nanofiber desirably contains less than 200 ppm, preferably less than 100 ppm, more preferably less than 50 ppm metal. (The term metal shall include all metal whether in elemental, ionic or chemically bound in compounds.) Such graphitic carbon nanofiber when added in amount, for example, between about 3 and 10 percent by weight, preferably between about 4 and 10 percent by weight of cathodes comprising highly resistant copper iodate, can very significantly lower the resistivity of the cathode. This in turn can make such cathodes very suitable for use in alkaline cells, particularly alkaline cells having an anode comprising zinc and electrolyte comprising aqueous potassium hydroxide.

The cathode mixture 812 includes an aqueous KOH electrolyte solution and the mixture can be prepared wet, with aqueous KOH included before the mixture is inserted into the cell. For example, the casing 820 can be filled with the cathode mixture and the central portion of the cathode mixture can be excavated leaving the annular cathode 812 as shown in FIG. 1. The wet cathode mixture can be compacted while in the cell. Alternatively, the wet mixture can be compacted into disks 812a before insertion into the cell and then, optionally, additionally compacted while in the cell. Alternatively, the cathode mixture 812 can be prepared by first dry mixing the copper iodate, and graphite material with sulfur optionally added. The dry mixture can be compacted into the cell casing 820 or can be compacted into disk shaped blocks 812a, which can be inserted into the cell in stacked arrangement. A separator sheet 890 can be placed against the inside surface of cathode disks 812a. Generally, separators conventionally used in zinc/$MnO_2$ alkaline cells can be used for separator 890 in the present cell 810 having a cathode 612 comprising copper iodate. Separator 890 can be of cellulosic film or a film formed of nonwoven material comprising polyvinylalcohol and rayon fibers. Separator 890 can be of a single layer of such nonwoven material or can be a composite having an outer layer of cellophane adhered to the nonwoven material. The nonwoven material can typically contain between about 60 weight percent to 80 weight percent polyvinylalcohol fibers and between about 20 and 40 weight percent rayon fibers. Separator 890 can be positioned so that the cellophane layer is adjacent to either cathode 812 or anode 815. The above described separators are known and have been used in connection with conventional zinc/$MnO_2$ alkaline cell and are also suitable for use in the present alkaline cell 810. Aqueous KOH electrolyte can be poured over the dry cathode wherein it becomes absorbed into the separator and cathode. The anode material 815 can then be added to the cell.

The copper iodate $Cu(IO_3)_2$ can be prepared by the reaction between a copper salt (i.e., $Cu(SO_4)_2$) and iodic acid ($HIO_3$) typically carried out at room temperature. The copper iodate is available in dry form $Cu(IO_3)_2$ or as a hydrate $Cu(IO_3)_2 \ H_2O$ under the product designation $Cu(IO_3)_2 \ H_2O$ from Ajay North America Company. Either form of the copper iodate can be used in cathode mixture 812. The copper iodate for use in cathode 812 is a powder having an average particle size (dry) between about 1 and 100 micron, desirably between about 1 and 50 micron, typically about 6 micron. The copper iodate has a real density of about 5.24 g/cc and average BET surface area of about 1.2 $m^2/g$. The real density of a solid is the weight of the sample divided by the real volume. The real volume of a sample is the actual volume less volume occupied by entrapped air between the particles and pores within the particles. The BET surface area ($m^2/g$) (Brunauer, Emmett and Taylor method) is the standard measurement of particulate surface area by gas (nitrogen and/or other gasses) porosimetry as is recognized in the art. The BET surface area measures the total surface area on the exterior surface of the particle and also that portion of surface area defined by the open pores within the particle available for gas adsorption and deadsorption when applied. The decomposition temperature of copper iodate is greater than about 450° C. The solubility of copper iodate in 6 Normal KOH aqueous solution after room temperature storage for 1, 2, and 4 weeks as measured in ppm $Cu^{2+}$ ions in solution is 1.6, 2, and 1.8, respectively.

Anode 815 comprises zinc and aqueous KOH electrolyte. The electrolyte in the anode comprises a conventional mixture of KOH, ZnO and gelling agent. The zinc serves as the anode active material. The anode and cathode can be separated by a conventional ion porous separator 890, for example, comprising polyvinylalcohol and cellulosic fibrous material. After cell 810 is filled an insulating plug 860 is inserted into open end 816. Insulating plug 860 may be of polypropylene, talc filled polypropylene, sulfonated polyethylene or nylon. Plug 860 can have a thinned portion 865 therein typically of a small circular, oval or polygonal shape. Thinned portion 865 functions as a rupturable membrane which can be designed to rupture thereby releasing excessive gas within the cell. This guards against excessive buildup of gas pressure within the cell, for example, if the cell is subjected to excessive heat or abusive operating conditions. The plug 860 is preferably snap fitted around circumferential step 818 as shown in the figure so that the plug locks in place into the open end 816. The peripheral edge 827 of casing 820 is crimped over the top of insulating plug 860. A paper insulating washer 880 is applied over the crimped peripheral edge 827 of casing 820. Insulating washer 880 can be a polyethylene coated paper washer. A terminal end cap 830 is welded to the head of current collector 840. An elongated current collector 840 is then inserted (force fitted) into aperture 844 of insulating plug 860 so that end cap 830 comes to rest against insulating washer 880. Current collector 840 can be selected from a variety of known electrically conductive metals found to be useful as current collector materials, for example, brass, tin plated brass, bronze, copper or indium plated brass. The current collector 840 used in the test cells was of brass. Conventional asphalt sealant may be preapplied around current collector 840 before it is inserted into aperture 844. A film label 870 is applied around casing 820. The terminal end cap 830 becomes the negative terminal of alkaline cell 810 and pip 825 at the closed end of casing 820 becomes the positive terminal.

The cell 810 shown in FIG. 1 can be an AA cell. However, the alkaline cell shown in the figure is not intended to be restricted to any particular size. Thus, the present invention is applicable to AAAA, AAA, C and D size cylindrical alkaline cells as well as button size alkaline cells of any size or shape. Alkaline cell 810 is not intended to be restricted to any particular cell chemistry or cell size, except that the cathode 812 is prepared utilizing the cathode mixture of invention comprising copper iodate and graphite material (sulfur optionally added). The above cell (FIG. 1) can be an AAAA, AAA, AA, C or D cells. These standard cell sizes are recognized in the art and are set by the American National standards Association or in Europe by the International Electrotechnical Commission (IEC). The AA cylindrical cell as referenced herein had standard overall dimensions as given by the American National Standards Institute (ANSI) battery specification ANSI C18.1M, Part 1-1999 as follows: The overall length from positive and negative terminal tips is between 49.2 mm and 50.5 mm and overall outside cell diameter is between 13.5 mm and 14.5 mm.

Thus cell 810 can contain conventional alkaline cell anode chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Pat. No. 5,401,590, herein incorporated by reference. The cell 810 of the invention also preferably does not contain added amounts of lead and thus can be essentially lead free, that is, the total lead content is less than 30 ppm, desirably less than 15 ppm of total metal content of the anode.

Figure 2:
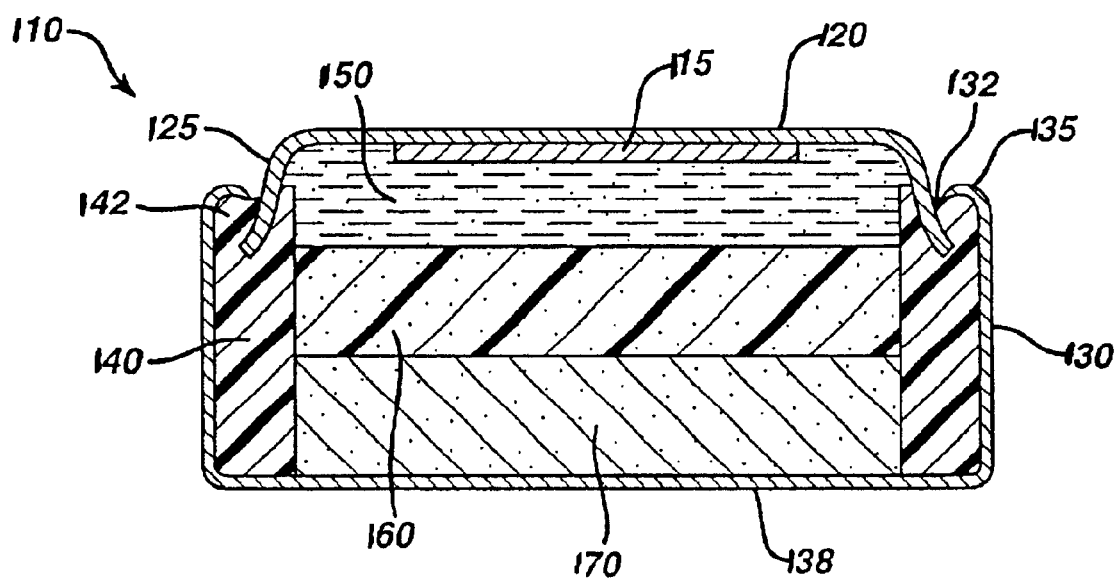
FIG. 2 is a cross sectional view of a cylindrical button cell of an alkaline cell having the cathode of the invention.

A zinc/manganese dioxide alkaline cell also can be fabricated in the form of a button or coin cell 110 as shown in FIG. 2. The cell 110 can include a cathode 170 comprising the cathode mixture of the invention. Such cathode mixtures, can comprise copper iodate, 82 to 90 wt. %, graphite, for example, expanded graphite, between about 4 and 10 wt. %, and between about 5 and 10 wt. % of aqueous KOH electrolyte (aqueous KOH electrolyte is 30 to 40 wt. % KOH concentration, preferably between 35 and 40 wt. % KOH concentration). The aqueous KOH electrolyte preferably also contains about 2 wt. % ZnO. Sulfur can be optionally added in amounts preferably between about 5 to 10 wt. % of the cathode mixture. In place of sulfur or in admixture with sulfur or elements such as selenium (Se) and tellurium (Te) can be used. The cathode mixture can optionally also comprise between about 0.1 to 0.5 wt % of a polyethylene binder. The addition of sulfur enhances the performance of the cell because it elevates the average running voltage of the cell, typically up to about 0.2 volts and even higher. This in turn can result in longer cell life.

The anode material 150 comprises: Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the tradename "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is between about 69.2 and 75.5 percent by volume of the anode. It shall be understood that the term zinc as used herein shall include such zinc alloy powder, since the alloy powder is composed almost entirely of zinc and functions electrochemically as zinc.

The separator 160 can be a conventional ion porous separator as described above with respect to separator 890. In the specific embodiment shown in FIG. 2, referenced in the examples, the separator 160 comprises an outer layer of cellulose and an inner layer of a nonwoven material composed of cellulosic (rayon) and polyvinylalcohol fibers. The outer layer of cellulose abutted the cathode electrode.

In the button cell 110 shown in FIG. 2, a disk-shaped cylindrical housing 130 is formed having an open end 132 and a closed end 38. Housing 130 is formed from nickel-plated steel. An electrical insulating member 140, preferably a cylindrical member having a hollow core, is inserted into housing 130 so that the outside surface of insulating member 140 abuts and lines the inside surface of housing 130. Alternatively, the inside surface of housing 130 can be coated with a polymeric material that solidifies into insulator 140 abutting the inside surface housing 130. Insulator 140 can be formed from a variety of thermally stable insulating materials, for example, nylon or polypropylene.

The cathode mixture 170 comprising copper iodate, graphite, aqueous electrolyte and optionally sulfur can be prepared by simple mixing at ambient temperature in a conventional blender until a homogenous mixture is obtained. The graphite can be flaky natural crystalline graphite, flaky crystalline synthetic graphite, expanded graphite or any mixture thereof. The cathode 170 is applied as a layer or a pressed disk abutting the inside surface of the closed end 138 of housing 130. The separator sheet 160 is placed overlying cathode 170. Additional aqueous electrolyte can be added so that electrolyte fully penetrates through separator sheet 160 and cathode 170. A layer of anode mixture 150 comprising particulate zinc, aqueous KOH electrolyte solution (35–40 wt % KOH and 2 wt. % ZnO), and gelling agent is applied to the separator sheet 160. The anode cover 120, formed preferably of nickel-plated steel, is inserted into the open end 132 of housing 130. An anode current collector 115 comprising a sheet of brass, tin-plated brass, bronze, copper or indium-plated brass can optionally be welded to the inside surface of anode cover 120. Peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and the housing 130 at the closed end 138 functions as the cell's positive terminal.

Test cylindrical button cells 110 had a diameter of 15.0 mm and depth of 6.98 mm.

The separator 160 was a conventional ion porous separator consisting of an inner layer of a nonwoven material of cellulosic (rayon) and polyvinylalcohol fibers and an outer layer of cellophane. The same anode mixture comprising particulate zinc was used in each test cell. The cathode composition was varied as indicated in following examples. The performance of the cells, service life (milliamp-hrs) and energy output (milliwatt-hrs) was determined by discharging at a given medium current density of 21 milliAmp/cm$^2$ to a cut off voltage of 0.8 Volts.

In the case of the comparative test (Example 1) using an anode comprising zinc and a cathode comprising $MnO_2$, the cells 110 and 810 were balanced on the basis that milliamp-hrs capacity of zinc (based on 810 milliamp-hours per gram zinc) divided by the milliamp-hrs capacity of $MnO_2$ (based on 370 milliamp-hours per gram MnO2) is about 1. In the cells tested (Examples 2–3) using an anode comprising zinc and cathode comprising copper iodate the cells 110 and 810 were balanced on the basis that the milliamp-hrs capacity of zinc (based on 810 milliamp-hours per gram zinc) divided by the milliamp-hrs capacity of copper iodate (based on 907 milliamp-hours per gram copper iodate) is about 1.

EXAMPLE 1

(Comparative-Zinc anode; MnO2 Cathode)

Test cylindrical cells 110 were prepared. The cell 10 had an overall dimension of about 15 mm diameter and 6.98 mm depth. The total internal volume of cell 110 available for cathode 70 and anode 50 was about 177 cubic millimeters. Test cells 110 were prepared with a anode 50 comprising Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the trade name "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode is between about 1.75 and 2.2 grams zinc per cubic centimeter of anode. The percent by volume of the aqueous electrolyte solution in the anode is between about 69.2 and 75.5 percent by volume of the anode.

The cathode 170 can have the following representative composition: 80–87 wt % of electrolytic manganese dioxide (e.g., Trona D from Kerr-McGee), 4–10 wt % of expanded graphite (Timcal E-BNB90, BET surface of 24.3 m$^2$/g), 5–10 wt % of an aqueous KOH solution having a KOH concentration of about 35–40 wt. %. The cathode 70 had 0.3 grams of $MnO_2$ and was balanced with an amount of zinc in anode 50 calculated as above described. A specific cathode composition which was used for Example 1 is as follows:

| | Cathode Composition[1] | |
|---|---|---|
| | Wt. % | Vol. % |
| MnO$_2$ (EMD) | 88 | 73 |
| Expanded graphite (Timcal E-BNB90) | 6 | 10 |

-continued

| Cathode Composition[1] | | |
|---|---|---|
| | Wt. % | Vol. % |
| KOH aqueous Solution (36 wt % KOH and 2 wt % ZnO) | 6 | 17 |
| | 100 | 100 |

Notes:
[1]The vol. % values have been converted from wt. % using the following real densities: $MnO_2$ (EMD), 4.48 g/cc; expanded graphite (Timcal E-BNB90), 2.25 g/cc; and 36 wt % KOH aqueous solution 1.35 g/cc.

The cell 110 is discharged at a constant rate of 22 milliAmp (current density of about 21 milliAmp/cm$^2$ and approximately equivalent to a constant rate of discharge of 250 milliAmp in a AA cell) to a cut off voltage of 0.3 volts. The cell had a time averaged running voltage of about 1.1 volts. The capacity obtained at this cut off voltage is 100 milliAmp-hrs. The specific capacity of the $MnO_2$ is 300 milliAmp-hours per gram (1350 milliAmp-hrs per cubic centimeter). The energy output of the cell is 110 milliWatt-hrs.

EXAMPLE 2

Test cell 110 is prepared as in example 1 except that the cathode 170 is formed of the following cathode mixture of the invention comprising copper iodate $Cu(IO_3)_2$. Graphite material in the form of expanded graphite was added. The cathode 170 had 0.4 grams of copper iodate and was balanced with a slight excess of zinc in anode 150 as above described.

| Cathode Composition[1] | | |
|---|---|---|
| | Wt. % | Vol. % |
| $Cu(IO_3)_2$ | 89 | 72 |
| Expanded graphite (Timcal E-BNB90) | 5 | 9 |
| KOH aqueous Solution (36 wt % KOH and 2 wt % ZnO) | 6 | 19 |
| | 100 | 100 |

Notes:
[1]The vol. % values have been converted from wt. % using the following real densities: $Cu(IO_3)_2$, 5.24 g/cc; expanded graphite (Timcal E-BNB90), 2.25 g/cc; and 36 wt % KOH aqueous solution, 1.35 g/cc.

The cell 110 is discharged at a constant rate of 22 milliAmp (current density about 21 milliAmp/cm$^2$ and approximately equivalent to a constant rate of discharge of 250 milliAmp in an AA size cell) to a cut off voltage of 0.3 volts. The cell had a time averaged running voltage of about 0.5 volts. The capacity obtained at this cut off voltage is 360 milliAmp-hrs. The specific capacity of the copper iodate is 900 milliAmp-hours per gram (4716 milliAmp-hrs per cubic centimeter). The energy output of the cell is 180 milliwatt-hrs.

EXAMPLE 3

Test cell 110 is prepared as in example 1 except that the cathode 170 is formed of the following cathode mixture of the invention comprising copper iodate $Cu(IO_3)_2$, and added sulfur. Graphite in the form of expanded graphite was added. The cathode 170 has 0.3 grams copper iodate and is balanced with an amount of zinc in anode 150 calculated as above described.

| Cathode Composition[1] | | |
|---|---|---|
| | Wt. % | Vol. % |
| $Cu(IO_3)_2$ | 82 | 61 |
| Expanded graphite (Timcal E-BNB90) | 5 | 9 |
| Sulfur | 7 | 13 |
| KOH aqueous Solution (36 wt % KOH and 2 wt % ZnO) | 6 | 17 |
| | 100 | 100 |

Notes:
[1]The vol. % values have been converted from wt. % using the following real densities: $Cu(IO_3)_2$, 5.24 g/cc; expanded graphite (Timcal E-BNB90), 2.25 g/cc; sulfur, 2.07 g/cc; and KOH aqueous solution, 1.35 g/cc.

The cell 110 is discharged at a constant rate of 22 milliAmp (current density of about 21 milliAmp/cm$^2$ and approximately equivalent to a constant rate of discharge of 250 milliAmp in an AA size cell)) to a cut off voltage of 0.3 volts. The cell had a time averaged running voltage of about 0.9 volts. The capacity obtained at this cut off voltage is 360 milliAmp-hrs. The specific capacity of the copper iodate is 900 milliAmp-hours per gram (4716 milliAmp-hrs per cubic centimeter). The energy output of the cell is 324 milliWatt-hrs.

EXAMPLE 4

Test cell 110 is prepared as in example 1 except that the cathode 170 is formed of the following cathode mixture of the invention comprising copper iodate $Cu(IO_3)_2$ and graphite material in the form of graphitic carbon nanofibers. The cathode 170 had 0.3 grams of copper iodate and was balanced with zinc in anode 150 as above described.

| Cathode Composition[1] | | |
|---|---|---|
| | Wt. % | Vol. % |
| $Cu(IO_3)_2$ | 86 | 67 |
| Graphitic carbon nanofiber[2] (PR19HT from Applied Sciences) | 8 | 15 |
| KOH aqueous Solution (36 wt % KOH and 2 wt % ZnO) | 6 | 18 |
| | 100 | 100 |

Notes:
[1]The vol. % values have been converted from wt. % using the following real densities: $Cu(IO_3)_2$, 5.24 g/cc; graphitic carbon nanofiber, 2.25 g/cc; and 36 wt % KOH aqueous solution, 1.35 g/cc.
[2]Graphitic carbon nanofiber from Applied Sciences, Cedarville, Ohio post heat treated at temperature between 2500° C. and 3100° C. to remove iron impurities. The fibers had an average diameter of 200 nanometer and average length of 200 micron.

The cell 110 is discharged at a constant rate of 22 milliAmp (current density of about 21 MilliAmp/cm$^2$ and is approximately equivalent to a constant rate of discharge of 250 milliAmp in an AA size cell)) to a cut off voltage of 0.3 volts. The cell had a time averaged running voltage of about 0.6 volts. The capacity obtained at this cut off voltage is 360 milliAmp-hrs. The specific capacity of the copper iodate is 900 milliAmp-hours per gram (4716 milliAmp-hrs per cubic centimeter). The energy output of the cell is 216 milliwatt-hrs.

The performance results of the examples are summarized in Table 1.

TABLE 1

Alkaline Cell With Zinc Anode Discharged at 22 milliAmp (Current Density 21 milliAmp/cm$^2$)[1]

| Example | Cathode | Capacity, mAmp-hrs | Average Running Voltage/ Energy Out, mWatt-hrs | Specific Capacity Cathode Active Material mAmp-hrs/cc |
|---|---|---|---|---|
| 1 | MnO$_2$ (EMD) and Expanded Graphite | 100 | 1.1/110 | 1350 |
| 2 | Cu(IO$_3$)$_2$ and Expanded Graphite | 360 | 0.5/180 | 4716 |
| 3 | Cu(IO$_3$)$_2$ plus Expanded Graphite and Sulfur | 360 | 0.9/324 | 4716 |
| 4 | Cu(IO$_3$)$_2$ and Graphitic Carbon Nanofibers | 360 | 0.6/216 | 4716 |

Notes:
[1]Values in Table 1 summarize performance data collected in button cells (FIG. 2) at current density of 21 milliAmp/cm$^2$, approximately equivalent to a constant current discharge rate of 250 milliAmp for an AA size cell as depicted in FIG. 1.

As shown in Table 1 the alkaline cells of the invention with copper iodate cathode active material (Examples 2–4) exhibits a lower average running voltage during discharge than the comparative alkaline cell (Example 1) with conventional MnO$_2$ cathode. However, the copper iodate cells exhibited higher total capacity (mAmp-hrs) as well as higher specific capacity (mAmp-hrs/cc) than the comparative cell with MnO$_2$ cathode. The data presented in Table 1 also illustrates the beneficial effect of adding sulfur to the copper iodate cathode (Ex. 3) to achieve a higher running voltage and higher energy output. The data also shows the beneficial effect of using graphitic carbon nanofibers (Ex. 4) in place of expanded graphite as the conductive additive for copper iodate cathodes. The use of the graphitic carbon nanofibers elevates the running voltage and energy output of the cell.

Although the invention has been described with respect to specific embodiments, it will be appreciated that variations are possible within the concept of the invention. Thus, the invention is not intended to be limited to the specific embodiments herein described, but is better defined by the claims and equivalents thereof.

What is claimed is:

1. An electrochemical cell comprising an anode comprising anode active material, an aqueous alkaline electrolyte solution, a separator, and a cathode comprising copper iodate.

2. The cell of claim 1 wherein the cathode comprises copper iodate and a portion of said aqueous alkaline solution.

3. The cell of claim 1 wherein the anode active material comprises zinc.

4. The cell of claim 1 wherein the electrolyte solution comprises potassium hydroxide.

5. The cell of claim 1 wherein the cathode further comprises graphitic carbon.

6. The cell of claim 5 wherein the graphitic carbon comprises expanded graphite.

7. The cell of claim 5 wherein the graphitic carbon comprises graphitic carbon nanofibers having a diameter less than 500 nanometers.

8. The cell of claim 7 wherein said carbon nanofibers have a mean average diameter between about 50 and 300 nanometers.

9. The cell of claim 8 wherein said carbon nanofibers have a mean average length between about 0.5 and 300 micron.

10. The cell of claim 1 wherein the cathode comprises a mixture comprising copper iodate and sulfur.

11. The cell of claim 10 wherein the sulfur comprises between about 5 and 10 percent by weight of said cathode.

12. The cell of claim 5 wherein the graphitic carbon comprises between 4 and 10 percent by weight of the cathode.

13. The cell of claim 1 wherein the cathode comprises between about 82 and 90 percent by weight copper iodate.

14. The cell of claim 1 wherein the copper iodate is in particulate form having an average particle size between about 1 and 100 micron.

15. The cell of claim 1 wherein said cell comprises less than 50 parts by weight mercury per million parts total cell weight.

16. The cell of claim 7 wherein the graphitic carbon nanofibers comprise less than 200 parts by weight metal per million parts carbon.

17. An electrochemical cell comprising an anode comprising anode active material, an aqueous alkaline electrolyte solution, a separator, and a cathode comprising copper iodate and sulfur.

18. The cell of claim 17 wherein the sulfur comprises between about 5 and 10 percent by weight of said cathode.

19. An electrochemical cell comprising an anode comprising anode active material, an aqueous alkaline electrolyte solution, a separator and a cathode comprising copper iodate and graphitic carbon nanofibers.

20. The cell of claim 19 wherein said carbon nanofibers have a mean average diameter between about 50 and 300 nanometers.

21. The cell of claim 19 wherein the graphitic carbon nanofibers comprises between about 4 and 10 percent by weight of said cathode.

22. The cell of claim 19 wherein the graphitic carbon nanofibers comprise less than 200 parts by weight metal per million parts carbon.

* * * * *